(No Model.)

P. H. WHITE.
CHAIN GUARD FOR BICYCLES.

No. 599,820. Patented Mar. 1, 1898.

WITNESSES:
H. D. Nealy
J. A. Walsh

INVENTOR
Paul H. White,
BY
Chester Bradford,
ATTORNEY.

THE NORRIS PETERS CO., PHOTO-LITHO., WASHINGTON, D. C.

UNITED STATES PATENT OFFICE.

PAUL H. WHITE, OF INDIANAPOLIS, INDIANA, ASSIGNOR TO THE INDIANA BICYCLE COMPANY, OF SAME PLACE.

CHAIN-GUARD FOR BICYCLES.

SPECIFICATION forming part of Letters Patent No. 599,820, dated March 1, 1898.

Application filed January 9, 1897. Serial No. 618,642. (No model.)

*To all whom it may concern:*

Be it known that I, PAUL H. WHITE, a citizen of the United States, residing at Indianapolis, in the county of Marion and State of Indiana, have invented certain new and useful Improvements in Chain-Guards for Bicycles, of which the following is a specification.

The object of my said invention is to provide a chain-guard for bicycles which shall be inexpensive in construction, convenient to place in position, and easily adjusted to follow the adjustment of the rear-axle bearings, all as will be hereinafter more particularly described and claimed.

Figure 1:
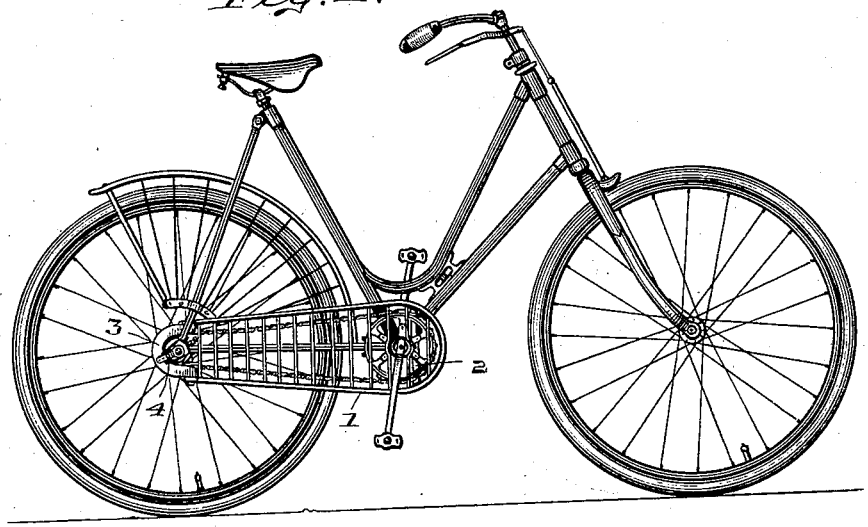
Figure 2:
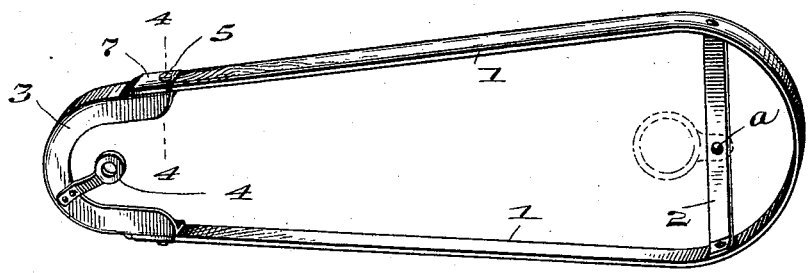
Figure 3:
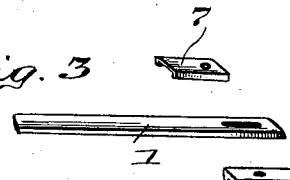

Referring to the accompanying drawings, which are made a part hereof and on which similar letters and numerals of reference indicate similar parts, Figure 1 is a side elevation of a bicycle equipped with my improved chain-guard; Fig. 2, a perspective view of the rim of said guard separately; Fig. 3, a perspective view of the parts where they join together, distributed a little apart from each other; and Fig. 4, a detail sectional view on the dotted line 4 4 in Fig. 2.

Figure 4:
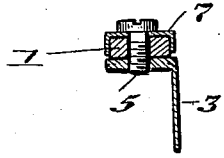

This guard is applicable to any bicycle. I have illustrated it in connection with what is known as the "Waverley Belle." It consists of a wooden strip 1, a cross-bar 2 near the front end, and a metallic piece 3, having an arm 4 at the other or rear end. The parts 1 and 3 are united by a screw or bolt 5, which passes through a slot in the part 1 and into a threaded hole in the part 3, as most plainly shown in Fig. 4. The part 3 is preferably thickened or reinforced around the hole to better adapt it to serve as a nut for the bolt, as is best shown in Figs. 3 and 4. I also preferably provide a flanged washer 7, which not only serves the usual purpose of a washer, but also embraces the wooden strip 1 at the point where the bolt 5 passes therethrough, and thus prevents said strip from being split at that point, as is best illustrated in Fig. 4.

This guard as a whole is secured in place on a bicycle by attaching the cross-bar 2 to the hanger in which the crank-axle revolves and the arm 4 to the shaft of the rear wheel. I have shown as a preferred means of attachment between the bar 2 and the housing or shaft-bearing of the crank-axle an ear on said housing and a pivot $a$ uniting said ear and said bar, as this allows a perfectly free movement when the other end is adjusted, as will be readily understood. However, the movement is so slight at this end that a rigid attachment may be made, in which case the adjustment at the other end merely causes a slight flexing of the parts. At the rear end the arm 4 is mounted directly on the end of the shaft, and consequently moves therewith.

By my invention the danger of catching the dress in the rear sprocket between it and the chain, as in cases where no shield is provided at this point, is entirely obviated, as is also the inconvenience of a fixed hood to cover these parts.

My device forms a chain-guard which is extensible to accommodate the adjustment of the rear wheel.

The wood guard 1 is not different from those heretofore employed, except that it is slotted where it is attached to the metallic piece 3, so that said parts may be adjusted in relation to each other as it becomes necessary or desirable to adjust the rear axle. In doing this the screw 5 is loosened when adjustment is required and tightened when the proper position is found. A further advantage of this construction is that the chain-guard follows the oblique adjustment of the rear wheel, and consequently the amount of clearance between the guard and the working parts is maintained alike at all points of adjustment.

Having thus fully described my said invention, what I claim as new, and desire to secure by Letters Patent, is—

A chain-guard for bicycles composed of a bent wooden strip 1, braced and supported by a cross-bar 2 joined to each side thereof near the bend therein, and a metal shield 3 which is adjustably secured to the ends of said strip, securing them together and formed to cover the rear sprocket, an ear mounted on the housing or shaft-bearing and formed with a branch extending to one side and pivoted to said brace 2, the arm 4 on the part 3 formed with a bearing in its outer end adapted to receive the end of the rear axle, the parts 1 and 3 being joined by a bolt passing through a slot in the part 1 into a screw-threaded perforation in the part 3, and the washer 7 formed with flanges which embrace the sides of said part 1 mounted under said bolt-head, all substantially as set forth.

In witness whereof I have hereunto set my hand and seal, at Indianapolis, Indiana, this 4th day of January, A. D. 1897.

PAUL H. WHITE. [L. S.]

Witnesses:
 JAMES A. WALSH,
 H. D. NEALY.